Jan. 13, 1931.  C. E. OGDEN  1,788,541
RECTIFIER
Filed April 23, 1925

INVENTOR:
Clarence E. Ogden,
BY Arthur H. Ewald,
ATTORNEY.

Patented Jan. 13, 1931

1,788,541

UNITED STATES PATENT OFFICE

CLARENCE E. OGDEN, OF CINCINNATI, OHIO

RECTIFIER

Application filed April 23, 1925. Serial No. 25,405.

My invention relates to rectifiers for alternating currents, and has particular reference to rectifiers of electrolytic type.

The principal object of this invention is to provide an electrolytic rectifying device which may be substituted for or interchangeably used with the rectifying bulb of the bulb type device.

Further objects of the invention will appear from the following detailed description thereof:

Figure 1:
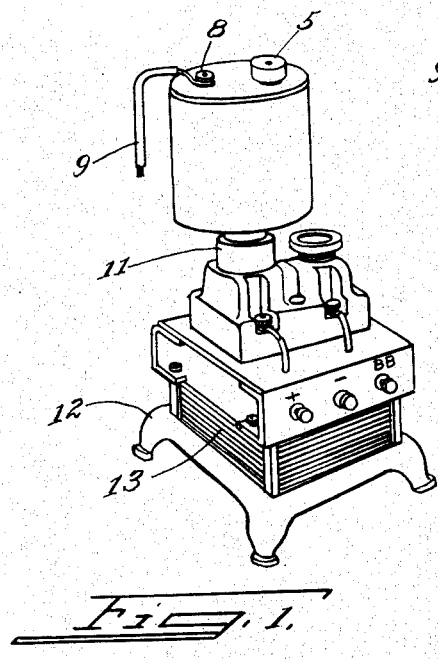
Figure 1 is a perspective view of a rectifier in accordance with this invention.
Figure 2:
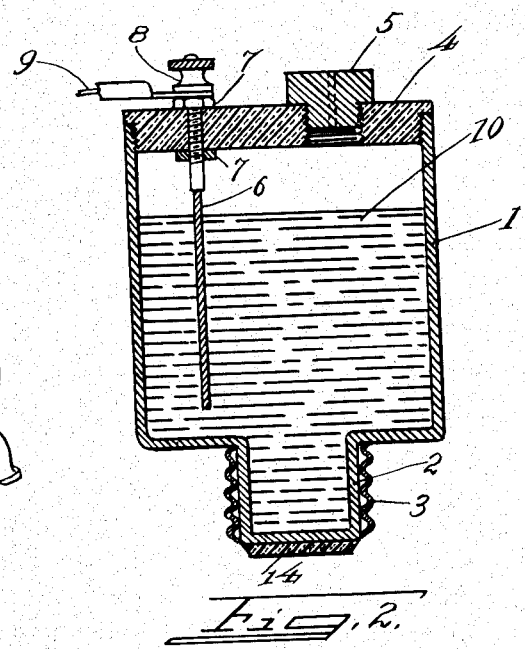
Figure 2 is a central vertical section of the rectifying elements.

The numeral 1 indicates a receptacle which may be constructed of aluminum, lead, or other conductive material. The lower end of the receptacle is provided with a shank 2 integrally formed therewith, and the outer surfaces thereof is threaded as shown at 3. The upper portion of the receptacle 1 is internally threaded for a rubber or other dielectric closure 4. The closure is provided with a vented cap 5 and also a perforation for an electrode 6 of tantulum or other suitable material. The electrode is secured in the closure 4 by means of nuts 7. The upper end of the electrode 6 is provided with a terminal 8 for a battery lead 9. The receptacle 1 is provided with an electrolyte 10 which may be sulphuric acid or any suitable electrolytic agent.

The threaded shank 3 is adapted to be screwed into the usual socket 11 of any bulb type rectifier, the frame 12 of which carries the usual transformer 13 and other elements and connections for attachment to any alternating line and transforming the line voltage. As these sockets are provided with two terminals, one centrally located in the base of the socket, the base of the shank is provided with an insulator 14 so that only one contact is made by the receptacle.

Figure 3:
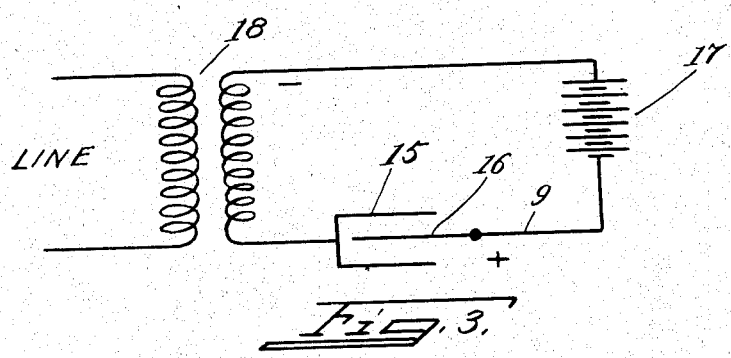
Figure 3 is a diagrammatic view of the device.

The connections are shown in Figure 3 of the drawings, in which 15 indicates the receptacle and 16 the tantulum electrode. The battery 17 to be charged is connected between the electrode 16 and the secondary of transformer 18.

From the foregoing description, it will be observed that I have provided an electrolytic rectifying device which is adapted to be inserted in the tube socket of any bulb type rectifier, or which may be employed in connection with a socket specially canstructed for its use. In operation the device operates in the same manner as any electrolytic rectifier. By the use of a device constructed in accordance with this invention, it will be observed that the expense of renewing the comparatively delicate and breakable bulbs in a bulb type rectifier is obviated, any necessary replacement in the electrode or other parts of the device may be made at comparatively low cost; such replacements are, in addition, seldom required. In manufacture the device may be fully completed by inclusion of the electrolyte before shipment, the closure and vent being temporarily sealed against leakage, so that the purchaser need only open the vent before putting the rectifier in service.

Having thus fully described my invention, what I claim as new and desire to secure by Letters Patent is:

A device of the character described comprising an electrically conductive receptacle, electrolyte in said receptacle, an electrode, means for supporting said electrode in said electrolyte and insulating same from said receptacle, and a shank on said receptacle arranged to be secured in a socket to connect a circuit through said receptacle and electrolyte with said electrode.

CLARENCE E. OGDEN.